United States Patent [19]

Rhee

[11] Patent Number: 4,539,365
[45] Date of Patent: Sep. 3, 1985

[54] UNIVERSAL CEMENT FOR NATURAL AND SYNTHETIC RUBBER TIRE COMPOUNDS

[75] Inventor: Chong-Kon Rhee, Broadview Heights, Ohio

[73] Assignee: The B. F. Goodrich Company, Akron, Ohio

[21] Appl. No.: 581,512

[22] Filed: Feb. 21, 1984

[51] Int. Cl.$^3$ ............................................. C08K 3/04
[52] U.S. Cl. ............................... 524/495; 152/209 R; 152/450; 156/910; 524/496; 524/526
[58] Field of Search ........................ 524/495, 496, 526; 152/330 R, 209 R; 156/910

[56] References Cited

U.S. PATENT DOCUMENTS

| | | | |
|---|---|---|---|
| 3,060,989 | 10/1962 | Railsback et al. | 152/330 R |
| 3,310,508 | 3/1967 | Roy | 524/526 |
| 3,342,238 | 9/1967 | Weinstock et al. | 152/330 R |
| 3,421,565 | 1/1969 | Reinbold | 524/495 |
| 3,514,423 | 5/1970 | Reinbold | 524/495 |

*Primary Examiner*—Lewis T. Jacobs
*Attorney, Agent, or Firm*—Harry F. Pepper, Jr.; Vincent A. Greene; Alfred D. Lobo

[57] ABSTRACT

A universal cement composition is disclosed suitable for both natural and synthetic rubber based tire compounds which solves the tack and cured adhesion problems heretofore encountered at the tread splice region of radial and bias/belted tires. The composition disclosed contains 75 to 90 parts by weight ("wt") of a cis-polybutadiene elastomer, 10 to 25 parts by wt of natural rubber, 5 to 30 parts by wt of a phenolic tackifying resin, and 40 to 80 parts by wt of a fine reinforcing carbon black and has an AMEDA carbon black dispersion rating of from 96 to 99 percent.

7 Claims, 6 Drawing Figures

UNIVERSAL CEMENT FOR NATURAL AND SYNTHETIC RUBBER TIRE COMPOUNDS

BACKGROUND OF THE INVENTION

The present invention relates to radial and bias/belted tires having tread ends joined by a tread splice adhesive composition and more particularly to a universal cement suitable for both natural and synthetic rubber-based tire compounds.

Natural rubber is used in tire adhesive compositions because it provides good tack to both natural and synthetic rubber compounds, but the use of substantial amounts of natural rubber (e.g., 20 phr or more) in tire tread and carcass adhesives applied to synthetic rubber tire compounds causes poor cured adhesion.

Tack may be defined as the ability of two uncured rubber materials to resist separation after bringing their surfaces into contact for a short time under a light pressure.

In synthetic rubber tires, synthetic rubber adhesive compositions are employed which contain phenolic tackifying resins to improve tack and which provide good cured adhesion. Various compositions have been proposed. For example, U.S. Pat. No. 3,342,238 discloses tread and carcass adhesives based on styrene-butadiene (SBR) rubber containing 30 or more parts by weight ("wt") of phenolic tackifying resins per hundred parts rubber (phr) to be used for adhering conventional SBR tread and carcass compounds. Although the tack of SBR rubber is notoriously poor, building tack can be improved by use of tackifying resins such as Koresin or certain alkyl-phenol aldehyde resins.

Attempts have been made to improve tack by increasing the amount of the tackifying resins as in U.S. Pat. No. 3,514,423 which discloses tread splice cements based on high-Mooney SBR rubber containing 65 or more phr of Koresin and optionally up to 30 phr of a cis-polybutadiene. However, tread end cements of this type do not have the properties required for modern radial or bias/belted tires, particularly at the critical tread splice.

Modern tires employ a plurality of circumferential belts between the tire carcass and tread with wires or textile cords embedded in a natural rubber-based rubber compound and employ a two-layer (dual) extruded tread comprising an outer cap portion formed of an abrasion-resistant synthetic rubber composition and an undertread portion formed of a natural rubber-based compound better suited for adhesion to the outermost belt. Serious problems have heretofore been encountered in such tires in the region of the tread splice because of poor tack and poor cured adhesion.

Prior to the present invention, no tread splice adhesive composition was available which provided good tack and good dynamic cured adhesion properties when applied to both natural rubber and synthetic rubber tread compounds. The synthetic rubber-based adhesive performed poorly with natural rubber-based compounds because of poor tack, and the natural rubber-based adhesives performed poorly with synthetic rubber-based compounds because of poor cured adhesion. This problem has existed for many years, and no solution was found. The rubber industry has for many years needed an effective synthetic rubber-based tire adhesive composition with good tack to a natural rubber compound but none was found.

One of the most serious problems encountered in the manufacture of synthetic rubber tires is the poor tack provided by synthetic tire adhesive compositions, such as commercial SBR-based tire cement compositions, particularly after aging for a substantial period of time, such as 20 hours (hr) or more. Tack retention is particularly important in a tread splice adhesive because of the critical importance of the splice. After aging the tack provided by a typical SBR-based tread-splice cement is poor and frequently inadequate for tire building when the cement is applied to an SBR-based tread cap compound having a low oil content and/or to an NR-based undertread compound as in typical radial tires having an extruded dual-layer tread.

In building such radial tires, an SBR-based tread cement is employed to splice the tapered cut ends of the dual-layer tread, and an NR-based tread cement is employed to adhere the outermost circumferential belt to the NR-based undertread. The SBR-based cement is normally applied by a brush or sprayer in a fast haphazard manner to the tread ends during tire building and usually slops over a portion of the underlying circumferential belts. This is highly undesirable because of the adverse effect on tack and is a source of defects in the tire adjacent to the tread splice.

The frequency of adhesive failures in modern tires has been reduced by improvements in rubber compounding and in tire building machines and building procedures, but the critical need for better tire adhesives has long been recognized particularly because of the adhesion problems associated with modern radial and bias/belted tires.

Blends of major amounts of SBR rubber and minor amounts of BR rubber are used extensively in tire tread compounds. In some cases, minor amounts of BR rubber are blended with natural rubber in truck tire treads. However, polybutadiene elastomers are considered to have poor processing characteristics and poor tack and have found little use in modern commercial tire adhesive compositions. Heretofore it was not recognized that cis-polybutadiene elastomers could be important in modern tire adhesive compositions or that major amounts of such elastomers were practical or desirable in such compositions.

SUMMARY OF THE INVENTION

The present invention provides an admirable solution to the adhesion problems described above in connection with modern radial and bias/belted tires.

In accordance with the invention, a unique tire tread adhesive composition is provided comprising 10 to 25 parts by weight (wt) of natural rubber (NR), 75 to 90 parts by wt of cis-butadiene rubber (BR), 40 to 80 parts by wt of a fine reinforcing carbon black, such as HAF black, 5 to 30 parts by wt of a suitable alkyl-phenol tackifying resin, and other compounding ingredients including zinc oxide, an antidegradant, sulfur and an accelerator. The composition is compounded and mixed so as to provide an AMEDA carbon black dispersion rating of at least 95 percent and preferably 96 to 99 percent. A special three-stage mixing procedure is essential to obtain substantially complete dispersion of the carbon black.

The unique BR-based tread adhesive composition of the invention functions remarkably well when applied to natural rubber compounds, such as the 100% NR compounds commonly used in the circumferential wire belts of radial tires. The tread adhesive composition is economical and provides good building tack and good dynamic cured adhesion properties when applied to conventional NR-based or SBR-based tire compounds.

The BR-based tire cement of this invention is ideal for use in splicing the tread ends of an extruded dual-layer tread as employed in modern radial and bias/belted tires employing an SBR-based tread cap compound with a low oil content and an NR-based undertread compound because of superior tack and tack retention as compared to known synthetic tread-splice cements.

The adhesive is unique in that it solves most of the serious adhesion problems encountered in modern tires near the tread splice due to the use of rubber compounds containing substantial amounts (i.e., 20 phr or more) of natural rubber.

Objects of the invention are to provide an economical tread adhesive which facilitates manufacture of high-quality radial and bias/belted tires in conventional tire building processes, which minimizes problems in the vicinity of the tread splice, and which functions effectively when applied to either natural or synthetic rubber tire compounds.

DETAILED DESCRIPTION OF PREFERRED EMBODIMENTS

Figure 1:
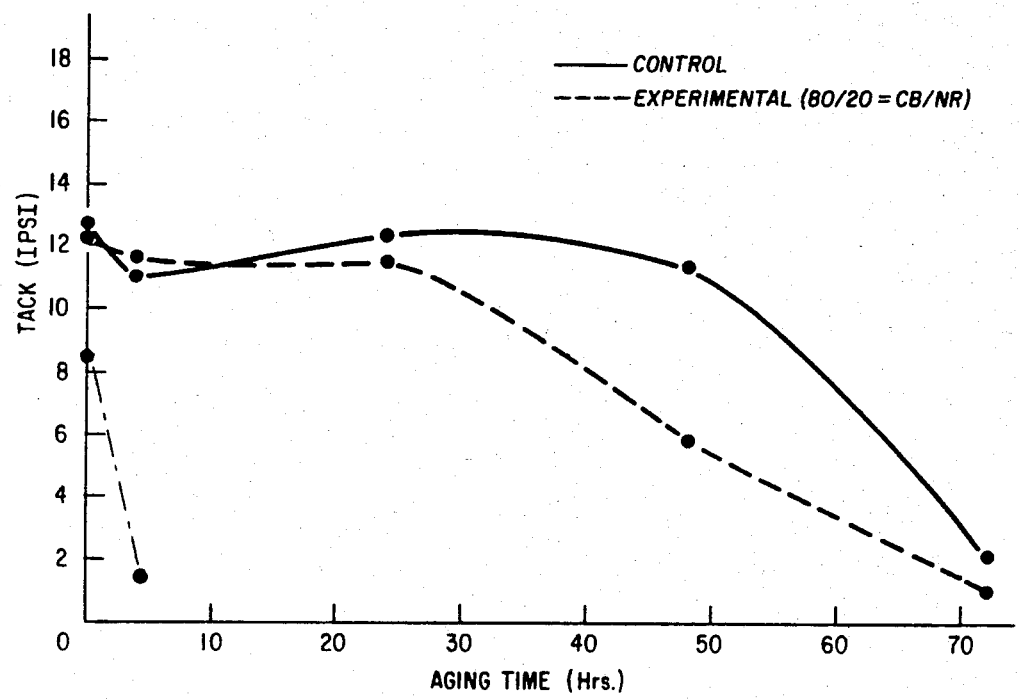
FIGS. 1 to 4 are graphs or diagrams indicating the effect of aging on the tack of natural rubber-based and SBR-based tread cement compositions relative to the composition of the present invention.

The present invention is particularly concerned with tire tread adhesives of a type suitable for use by tire manufacturers in the building of radial and bias/belted truck and passenger car tires having circumferential belts between the carcass and the tread such as those shown at pg. 47 of *Rubber World*, Vol. 174, June 1976; pgs 569–73 of "Science and Technology of Rubber" by F. R. Eirich, 1978; and pgs 849–52 of *Rubber Chem & Tech*, Vol. 53, No. 4, 1980. Such tires have heretofore had adhesion problems due to use of conventional rubber tread splice adhesives in tires employing both synthetic and natural rubber-based compounds.

As used herein and as understood in the industry the abbreviations NR, BR and SBR refer to natural rubber, butadiene rubber and styrene-butadiene rubber, respectively.

The invention is particularly concerned with the use of BR rubber or polybutadiene elastomers which preferably have a predominantly cis 1,4-structure and a Mooney viscosity (ML-4/100° C.) as measured on a Mooney viscometer of at least 30.

This invention involves the discovery that tread adhesives with vastly improved properties can be prepared from blends of 10 to 25 parts by wt of natural rubber and 75 to 90 parts by wt of a cis-polybutadiene elastomer per 100 parts by weight of the rubbers in the blend provided that a proper type of carbon black is employed and the composition is mixed in such a manner as to effect substantially complete dispersion of the carbon black and to provide an AMEDA carbon black dispersion rating of at least 95 percent.

The composition is unacceptable for use as a tread adhesive and cannot function satisfactorily with less than 75 phr of the cis-polybutadiene elastomer or with less than 10 phr of hevea rubber. Ordinarily the tread adhesive composition according to this invention requires at least 15 phr of natural rubber to provide adequate tack and adequate green strength. Best results are obtained when the rubber of the adhesive composition consists of from about 80 to 85 parts by wt of cis-polybutadiene and from about 15 to about 20 parts by wt of natural rubber.

The adhesive composition contains other compounding ingredients including an antioxidant and/or antiozonant, zinc oxide, a fatty acid, sulfur and an accelerator as are commonly used in rubber tread and carcass compositions.

The preferred adhesive compositions usually include, per 100 parts by wt of rubber, from 1 to 5 parts of zinc oxide, from 0.5 part to 4 parts of stearic acid or other fatty acid, from 1.5 to 4 parts of sulfur, from 0.5 part to 2.5 parts of vulcanization accelerators, and from 0.5 to 3 parts of antidegradants (antioxidants and/or antiozonants).

The compositions usually contain no more than 10 and preferably contain no more than 5 phr of oil. The compounding ingredients are selected so that the adhesive composition has adequate green strength and, when cured, has excellent physical properties comparable to those of the tread compound including a tensile strength of at least 2500 psi and a 300 percent modulus of at least 1400 psi.

A rapid routine determination of the degree of carbon black dispersion in rubber batches is made by the standard Automatic Microscope Electronic Data Accumulator (AMEDA) system. This system involves scanning, detection and counting of undispersed carbon black agglomerates and data processing (*Rubber Chem & Tech.*, Vol. 47, March 1974, pages 469–490).

The AMEDA carbon black dispersion rating of common commercial tire adhesive compositions is in the range of 80 to 90% and typically around 85%. Within that range, the BR-based composition of the present invention does not have the properties required in a tire adhesive. The composition cannot function satisfactorily with an AMEDA carbon black dispersion rating below 95%.

The AMEDA system was developed in the 1960's and has been used in the rubber industry for many years to evaluate carbon black dispersion. Detailed descriptions of the AMEDA system appear in various publications including the following:

1. J. L. Bayer, G. H. Denton, and R. E. Hassel, "Use of the AMEDA Microscope in Quantitative Microscopy," ASTM STP-430, *Am. Soc. Testing Mats.*, 1968, pp. 118–28.

2. R. J. Kadunce, "Carbon Black Dispersion Utilizing the AMEDA System" ACS-DRC Paper #27, presented at a meeting of the Rubber Division, *American Chemical Society*, Denver, Colo., October 1973, pp 1–20.

The AMEDA system involves automatic sample preparation, counting and data processing, and the carbon black dispersion rating, as set forth herein, is determined in the manner described in detail by Robert J. Kadunce in the above ACS Paper #27. Such dispersion rating, as set forth in the specification and claims hereof, means the Cabot-corrected dispersion rating in percent calculated according to formulas [4] and [5] on pg 8 of the 20-pg Kadunce report, Paper #27, namely $$D_{AMEDA}(\%) = 100(1 - (vV)/L)$$

where L is the volume percent of black in the compound, v is the estimated volume fraction of carbon black in the agglomerates, and V is the volume percent calculated by the formula $$V = 100 P_\beta / P$$

where P represents the total count and $P_\beta$ represents counts on the undispersed phase. The volume fraction v is 0.40 for the reasons given in the article by A. I. Medalia, *Rubber Chem & Tech*, 34, 1134 (1961).

The tread cement of the present invention requires 40 to 80 parts phr of a fine reinforcing carbon black having a surface area of at least 70 m²/g (sq. meters/gram) such as a high abrasion furnace (HAF) carbon black or a general purpose tread (GPT) carbon black. The preferred carbon black employed in the practice of the invention has an average particle size from 20 to 35 millimicrons and a surface area from 75 to 125 and more preferably 80 to 120 m²/g. The dibutyl phthalate absorption (DBPA) is preferably from 100 to 125 cm³/100 g of carbon (ASTM D2414-79). Commercial carbon blacks which provide excellent results include ASTM designations N330(HAF), N299, N303 (HAF-HS) and N347 (HAF-HS). Typical N330 carbon blacks sold under the names Philblack, Statex, United and Vulcan have an average particle size of from about 27 to about 30 millimicrons (mµ), an average surface area of around 82 to 83 square meters per gram (sq. m/gm) and a DBPA number of around 100 to 104. N299 is a general purpose tread (GPT) carbon black with high structure and high modulus having an average particle size of around 22 to 24 mµ, an average surface area of around 107 to 116 m²/gm and a DBPA of about 122 to 125. N347 carbon black has an average particle size of around 26 to 28 mµ, an average surface area of around 89 to 96 and a DBPA of about 122 to 126.

The reinforcing carbon blacks which are preferred for use in the present invention are HAF blacks and blacks, such as N299, which facilitate complete dispersion so that it is less difficult to obtain an AMEDA carbon black dispersion rating of 97 percent or higher.

The specifications for carbon black and other compounding ingredients as set forth herein are those recognized in the rubber art as reported, for example, in *Blue Book*, published 1983 by Bill Communications, Inc., and "Materials and Compounding Ingredients for Rubber and Plastics", published by Rubber World. Specification testing may, for example, be carried out according to ASTM D2414-79; D3493-79; and D3037-78.

The tread splice cements of the present invention employ 5 to 30 phr of known phenolic tackifying resins, such as novolak resins, alkylphenolacetylene reaction products, and the like. The tackifying resins preferably have a molecular weight from 500 to 2000 and a general structure as follows:

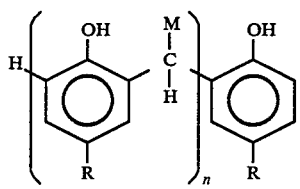

wherein M is hydrogen or a methyl group and R is a tertiary alkyl group having from 4 to about 18 carbon atoms, such as t-butyl, t-octyl or t-dodecyl; and, n is an integer in the range from 3 to about 10. The tackifying resin may be a novolak where M is hydrogen.

The tackifying resin may be formed from a para-tertiary alkyl phenol and acetylene or an aldehyde, such as formaldehyde or acetaldehyde. Good results are obtained using well known tackifiers, such as Koresin (a reaction product of para-tertiary alkyl phenol and acetylene), but phenolformaldehyde (PF) tackifying resins are preferred.

Commercial PF resins which are suitable for use in the practice of the invention include Resin 3472-30 and Arofene 8320PP (Ashland Chemicals) based on t-octylphenol; Resin SP 1077 (Schenectady Chemicals) based on t-octylphenol (epoxy-modified); Resin 187-1 and 187-3 (Ashland) based on t-dodecylphenol; and Koretack CG 5136 (BASF) based on t-octylphenol with aniline as the third monomer. These are described in *Rubber Chem and Tech.*, Vol. 55, pages 442–455. Other suitable tackifying resins include Koresin and PA-59-997 and PA-59-998 (alkyl phenol-acetylene reaction products) CRJ-418 and HRJ-302 (novolak resins made by Schenectady Chemicals). Mixtures of different tackifying resins can be used.

In accordance with the invention, up to 4.0 phr of an antidegradant are incorporated in the tread adhesive composition including at least 0.5 phr of a polymeric dihydroquinoline. It is preferable to employ from 0.5 to 2.5 phr of a polymerized 1,2-dihydro-2,2,4-trimethylquinoline, such as AgeRite Resin D (ARRD) sold by R. T. Vanderbilt.

Excellent results can be obtained by using a polymeric dihydroquinoline in combination with a substituted paraphenylenediamine (PPD) or a substituted diphenylamine. Suitable commercial polymeric dihydroquinolines include ARRD, AgeRite MA, Flectol H, Naugard Q, Pennox HR, Permanax TQ, Vulkanox HS, and Cyanox 12. The commercial substituted diphenylamines include Pennox A, Permanax OD, AgeRite NEPA, Vanox 12, AgeRite Stalite, Stalite S, Octamine, Flectol ODP, Pennox ODP and Naugard 445.

In Polylite, Octamine, Pennox A and the Stalites, the diphenylamine is alkylated in the para position (e.g., with octyl or nonyl groups). In other antioxidants suitable for use in the cements of this invention, one or more alkoxy or alkenoxy groups may be introduced in the para positions of diphenylamine as in Thermoflex A (dimethoxy) or AgeRite Hipar (isopropoxy). The substituent groups preferably have 3 to 12 carbon atoms.

The vulcanizable tread adhesive composition of this invention is compounded to provide a rubber with excellent physical properties and high tensile strength similar to the properties of standard tread and carcass compounds. The composition preferably employs from 1.5 to 4 phr of sulfur and from 0.5 to 2.5 phr of accelerators.

It is usually preferable to employ delayed-action sulfenamide accelerators made by reacting 2-mercaptobenzothiazole (MBT) with an amine, such as t-butylamine, t-octylamine, isopropylamine, cyclohexylamine, morpholine or dimethylmorpholine (see *Rubber Chem & Tech*, 53 393). Good results may be obtained using common accelerators, such as diphenylguanidine (DPG), Santocure NS (N-tert-butyl-2-benzothiazolesulfenamide, or other sulfenamide accelerators, or the reaction product of aniline and an aldehyde, such as butyraldehyde or heptaldehyde (i.e., Hepteen or Accelerate 832).

In the practice of the present invention, a blend of NR and BR rubbers is selected to provide the desired level of tack and also to provide the necessary level of green strength and cured adhesion. It is important that the components of the tire exhibit quick-grab tack when building the tire, and the tack bonds should have long term resistance to separation, because the green tire may be hung on a rack several days before molding and vulcanization. In addition, the bonded portions of an uncured tire must have adequate green strength so that there is no excess distortion or creep before molding and no tear during the expansion that occurs upon molding (or in the second stage for a radial tire).

Tack and tack retention are particularly important in tread splice adhesives because of the critical nature of the splice and the severe operating conditions encountered during the life of a tire. Obtaining a proper bond at the cut tapered surfaces at the ends of the tread is more difficult because of the fact that the rubber is cut cold to form a smooth dry non-tacky surface. This is another reason that the poor tack of conventional synthetic tread splice adhesives presents a serious problem in standard tire manufacturing operations.

In order to obtain the desired tack, green strength, and cured adhesion, the blend of rubber polymers to be employed in the adhesive composition mut be carefully chosen. Usually the blend is such that the adhesive composition has a Mooney viscosity (ML-4/100° C.) of from 30 to 70. At least a major portion of the cis-polybutadiene elastomer should have a Mooney viscosity in the range of from 30 to 80, but minor portions of the elastomer may have a viscosity outside this range. The cis content of the elastomer is at least 80 and usually from 90 to 98% or higher. The blend may contain a small amount of oil-extended BR rubber. However, the amount of oil is preferably limited because increases in oil content result in decreased tack.

It will be understood that, unless the context indicates otherwise, the term "parts" means parts by wt and "Mooney viscosity" refers to the viscosity number as indicated by the dial reading on a standard Mooney viscometer when using a large rotor after one min. of preheating followed by 4 min of shearing at 100° C.

|  | Parts by wt |
|---|---|
| Recipe No. 1-Undertread Composition | |
| Natural rubber | 30–100 |
| BR rubber | 0–50 |
| SBR rubber | 0–20 |
| Carbon black | 45–60 |
| Processing oil | 5–15 |
| Phenolic Tackifying resin | 2–4 |
| Antidegradants | 3–5 |
| Zinc oxide | 3 |
| Stearic acid | 1–2 |
| Sulfur | 1.7–2.5 |
| Accelerator | 1–2 |
| Recipe No. 2-NR-Based Cement Composition | |
| Natural rubber | 100 |
| Tackifying resin | 13.2 |
| Carbon Black | 40.0 |
| Zinc oxide | 3.0 |
| Fatty acids | 1.0 |
| Antidegradant (ARRD) | 1.0 |
| Sulfur | 4 |
| Retarder | 0.1 |
| Accelerator | 1.0 |
| Hydrocarbon Solvent | 2385. |
| Recipe No. 3-SBR-Based Cement Composition | |
| Styrene-butadiene rubber | 100 |
| Processing oil | 10 |
| Phenolic Tackifying resin | 40 |
| Carbon black | 60 |
| Zinc oxide | 3 |
| Antidegradant (Substituted Diphenylamine) | 1 |
| Sulfur | 2.75 |
| DPG Accelerator | 0.35 |
| Sulfenamide Accelerator | 1.35 |
| Hydrocarbon Solvent | 1250. |
| Recipe No. 4-Universal Cement Composition | |
| BR rubber (Taktene 1203) | 80–85 |
| Natural rubber (smoked sheets) | 15–20 |
| Phenolic tackifying resin | 10–20 |
| Carbon black (N299) | 60 |
| Zinc oxide | 3 |
| Stearic acid | 1 |
| Antidegradant (ARRD) | 1 |
| Substituted diphenylamine | 1 |
| Sulfur | 2.75 |
| Accelerator (DPG) | 0.3 |
| Accelerator | 1.3 |
| Hydrocarbon solvent | 1658. |
| AMEDA carbon black dispersion rating | 97%–98%. |

The present invention is particularly concerned with tread splice cements used in conventional radial or bias/belted tires having a series of circumferential belts between the tread and the carcass and having a two-layer extruded tread with cut tapered ends which are bonded together by the tread cement. Each of the circumferential belts comprises wires or textile cords embedded in a natural rubber-based rubber compound (i.e. 100%NR). The tire may be a steel-belted tire as disclosed, for example in U.S. Pat. No. 4,068,041. The extruded tread comprises a tread cap layer compounded to provide good wear characteristics and an undertread layer compounded to provide good adhesion to the natural rubber-based compound used in the circumferential belts.

The undertread compound may be a vulcanizable rubber compound as set forth in Recipe No. 1 containing conventional compounding ingredients selected to provide a rubber with good physical properties. A conventional undertread compound may for example, employ a 50/25/25 NR/BR/SBR blend with 50 phr of GPF carbon black and 10 phr or more of oil.

A conventional tread cap compound may, for example, employ a 30/70 or 40/60 BR/SBR blend with 55 to 85 phr of HAF carbon black and 25 to 60 phr of oil.

Conventional natural rubber-based and SBR-based tread cement compositions comparable to those of Recipes 2 and 3, respectively, are employed in the manufacture of modern radial tires to adhere the tread to the carcass and to the circumferential belts and to adhere the cut ends of the tread at the splice. The tackifiers used in these cement compositions are preferably phenolic resins such as PF novolak resins or alkyl phenol-acetylene reaction products. The carbon black is preferably an HAF black or similar reinforcing carbon black. The styrene-butadiene (SBR) rubber may, for example, have a Mooney viscosity from 40 to 80.

In the manufacture of radial or bias/belt tires according to the present invention, the conventional NR-based or SBR-based tread splice cement is replaced by a BR-based universal cement, such as 80/20 blend of cis-polybutadiene and hevea rubber.

An example of a universal cement (UC) according to the invention is set forth in Recipe No. 4 wherein the BR rubber is preferably a commercial cis-polybutadiene with a high cis 1,4 content such as 95 to 98% and a raw Mooney viscosity (ML-4/100° C.) which may be from 35 to 60. Suitable BR rubbers include Taktene 1202 (Polysar), Taktene 1203, Taktene 1220, Budene 1207 (Goodyear), Budene 1208, Cisdene 1203, Cis-4 1203 (Phillips), and Diene 55 NFA/AC. The BR rubbers may, for example, be of the type disclosed in U.S. Pat. Nos. 3,993,856; 4,020,255 and 4,198,496 having a cis-1,4 content of 90 to 98 percent or higher.

The phenolic tackifying resin of the UC tread cement may, for example, be a para-t-octyl phenol-formaldehyde resin with a molecular weight of from 900 to 1500. The antidegradant or age resister preferably includes a polymeric dihydroquinoline such as ARRD, in combination with a dialkyl PPD, an alkyl-aryl PPD or a substituted diphenylamine, such as an alkoxy diphenylamine (e.g., Thermoflex A).

Conventional accelerators may be used in the UC cement including delayed-action sulfenamide accelerators or others such as Hepteen or Accelerate 832.

A tread cement composition such as that set forth in Recipe No. 4 is commercially unacceptable without substantially complete dispersion of the carbon black. Adequate dispersion cannot be obtained when using the conventional Banbury mixing procedures, such as those described below, because of the problem created by the large amount of BR rubber. That problem has been solved by a seeding technique involving a special multi-stage mixing procedure described hereinafter which is effective when using a fine reinforcing carbon black of the proper type.

In a simple 2-stage Banbury mixing cycle in which all of the compounding ingredients except the curatives are added at the beginning of the cycle, the power curve (*Rubber Chem & Tech,* 53 252, 1980) involves (1) a filler incorporation (wetting) zone, (2) a filler dispersion zone, and (3) a homogenization zone. In the first zone the power demand as indicated on the power curve increases sharply to a peak and then subsides with progressive wetting of the carbon black filler by the rubber to a first minimum point on the curve. In the second zone there is a rapid rise of the power curve to a second peak as more power is required to break down the carbon black agglomerates, shear the rubber and disperse the discrete carbon black particles. In the third zone of homogenization the power demand decreases as the mixing is completed.

In order to provide a satisfactory tread cement according to this invention it is essential to employ a special multi-stage mixing procedure in which the natural rubber, a minor portion of the cis-BR rubber and a major portion of the carbon black required in the cement recipe are initially added to the mixer and mixed in the first filler incorporation (wetting) zone before the tackifying resins and other compounding ingredients are added.

The tackifying resins and other compounding ingredients have an adverse effect if they are added at the beginning of the cycle, and it becomes impossible to obtain adequate dispersion of the carbon black in the cis-BR rubber. Therefore, it is necessary, when preparing the masterbatch in the first Banbury mixing stage, to raise the ram at the end of the first filler incorporation (wetting) zone near the first minimum point on the power curve and then to add the tackifying resins and other ingredients before the mixing in the first stage is completed.

For example, when preparing an 80/20 BR/NR tread cement composition, such as that set forth in Recipe No. 4, a special 3-stage Banbury mixing procedure is employed. The first stage involves preparation of a masterbatch (192 parts) consisting of 60 cis-BR, 40 NR, 80 carbon black (i.e., N299), 6 zinc oxide, 2 stearic acid, 2 ARRD and 2 diphenylamine. The rubber and carbon black (180 parts) are initially mixed for a period of time beyond the first peak of the power curve until the power demand decreases to the first minimum point on said curve. The ram of the Banbury mixer is then raised, the remaining ingredients of the masterbatch (12 parts) are added, the ram is lowered, and the mixing is completed. In the second stage, 96 parts by wt of the masterbatch are mixed with 50 parts of cis-BR rubber and 20 parts of carbon black. The sulfur and accelerators are added in the third and final Banbury stage. Such a procedure makes it possible to provide the adhesive composition with an AMEDA carbon black dispersion of at least 97 percent using only a standard Banbury mixer.

After mixing the adhesive composition is dissolved in naphtha or other hydrocarbon solvent to form a universal tread cement suitable for use on both NR-based and SBR-based rubber compounds. Tread splice cements of this type have been found to perform extremely well when employed for tread and splicing in the manufacture of radial passenger and truck tires because of good tack, good tack retention and good dynamic cured adhesion. The tread cements of this invention have tack characteristics far superior to conventional SBR-based tread cements as explained hereinafter with regard to FIGS. 1 to 6 of the drawings. As a result defects in radial tires due to adhesion problems in the vicinity of the tread splice are minimized when using standard factory tire building procedures.

Figure 2:
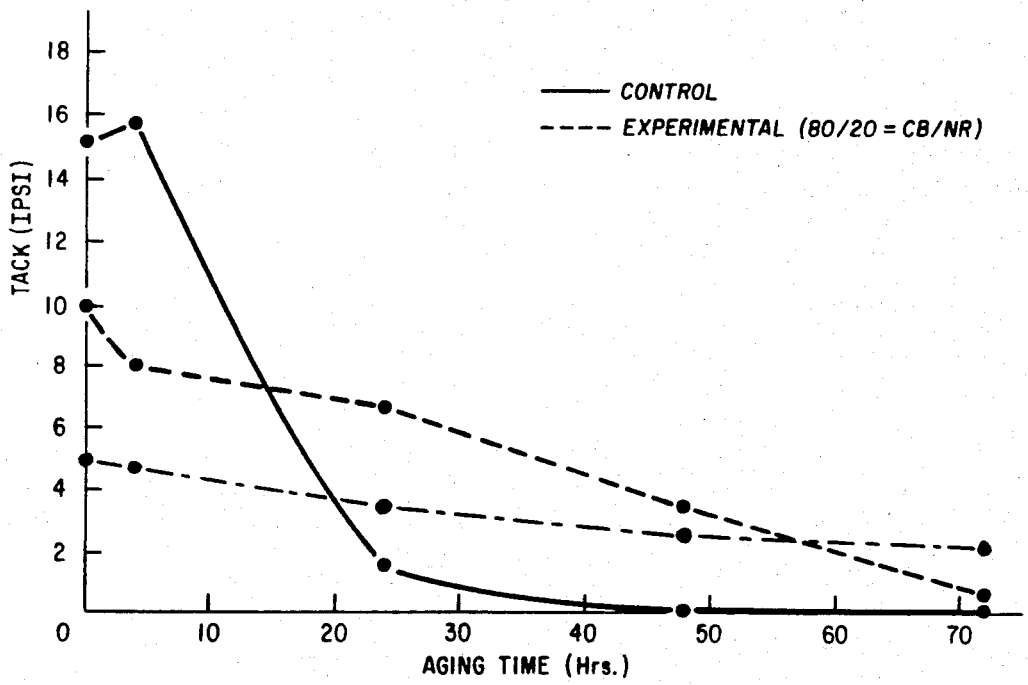
Figure 3:
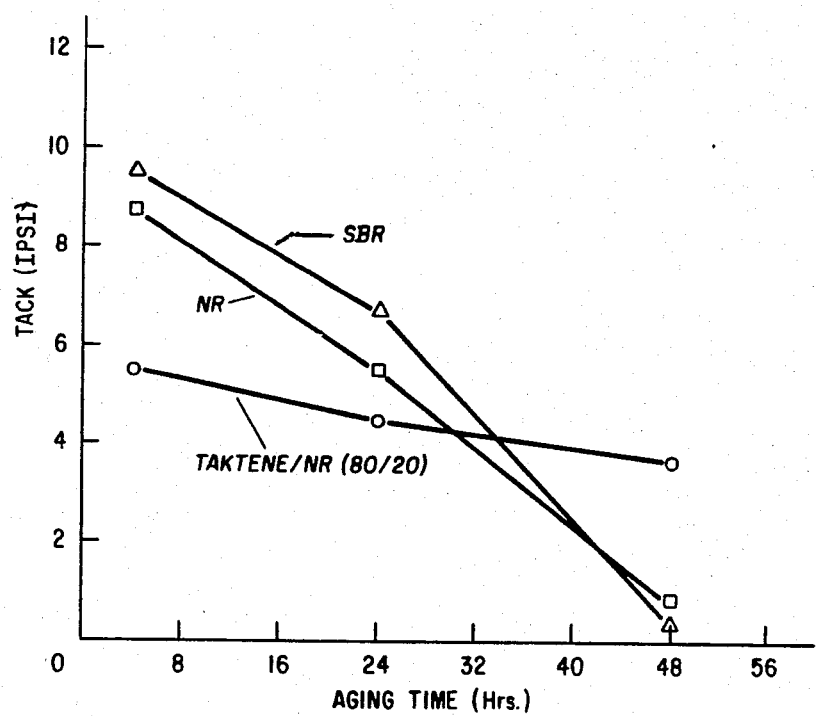

FIGS. 1 to 3 indicate the effect of aging on tack (in-lbs/sq. in) in connection with the tread cements of Receipes Nos. 2, 3, and 4. In FIG. 1 the control is the NR-based tread cement, and in FIG. 2 the control is the SBR-based tread cement. FIG. 1 indicates that the universal cement (UC) of this invention containing 80 phr cis-polybutadiene (CB) has a tack comparable to the NR-based cement for up to 24 hours when applied to an NR-based undertread, such as Recipe No. 1, with 15 phr of oil. The static cured adhesion data on these cements indicates that the force required for separation is 308 lb/in for the UC cement and 368.7 lb/in for the NR-based cement. Dynamic cured adhesion data comparing the two cements as applied to the same NR-based undertread composition indicates failure of the NR-based cement at 5.5 to 12.5 million cycles and failure of the UC cement at 7.4 to 9.8 million cycles.

The tack for the SBR-based cement is so poor when applied to the NR-based undertread that the cement is unacceptable. One test indicates that such tack falls from about 8.4 to about 1.4 IPSI in 4 hours and is negligible after 24 hr (see FIG. 1).

FIG. 2 indicates that the UC cement has a tack far superior to that of the SBR-based cement after aging for 24 hr when applied to a conventional 40/60 BR/SBR tread cap composition containing 50 phr of oil. The static cured adhesion data indicates that the separation force is 263 lb/in for the UC cement, 312 lb/in for the SBR-based cement, and 79 lb/in for the above NR-based cement. The dynamic cured adhesion data indicates failure after 5.3 million cycles for the UC cement, failure after 5.7 million cycles for the SBR-based cement, and failure after 0.56 million cycles for the NR-based cement.

The tack for the NR-based cement is 3.2 IPSI after 72 hours and is sufficient to permit tire building, but the cured adhesion provided by such cement is so poor that the cement is unacceptable.

FIG. 3 indicates that the UC cement (indicated by the circles) maintains tack longer upon aging than the NR-based or SBR-based cement when applied to a special 60/40 BR/SBR tread cap compound containing 60 phr of oil. The SBR cement has good tack for 24 hr on such a high-oil synthetic rubber substrate, but its tack after 24 hr would be nominal as applied to an undertread compound (i.e., FIG. 1) based on natural rubber.

Figure 4:
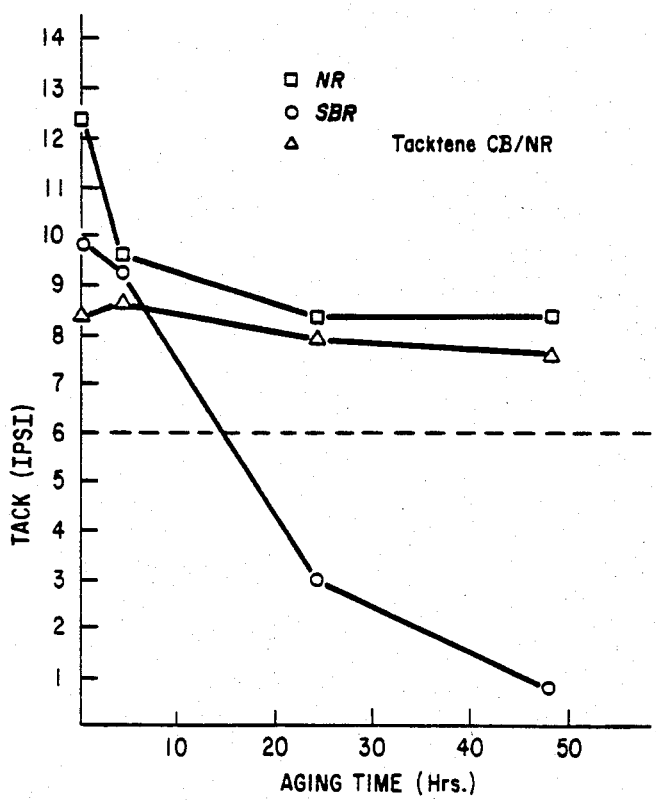

FIG. 4 indicates that both the UC cement (indicated by triangles) and the NR-based cement (indicated by squares) have good tack retention for at least 48 hours when applied to a conventional 30/70 BR/SBR passenger tread cap compound containing 28 parts phr of oil, whereas the SBR-based tread cement (indicated by the circles) has poor tack retention and loses most of its tack after 24 hr. The tack of the SBR-based tread cement as applied to a conventional undertread composition (i.e., Recipe No. 1) is even worse after aging for a few hours so that it is apparent why such a cement causes so many problems at the tread splice.

Figure 5:
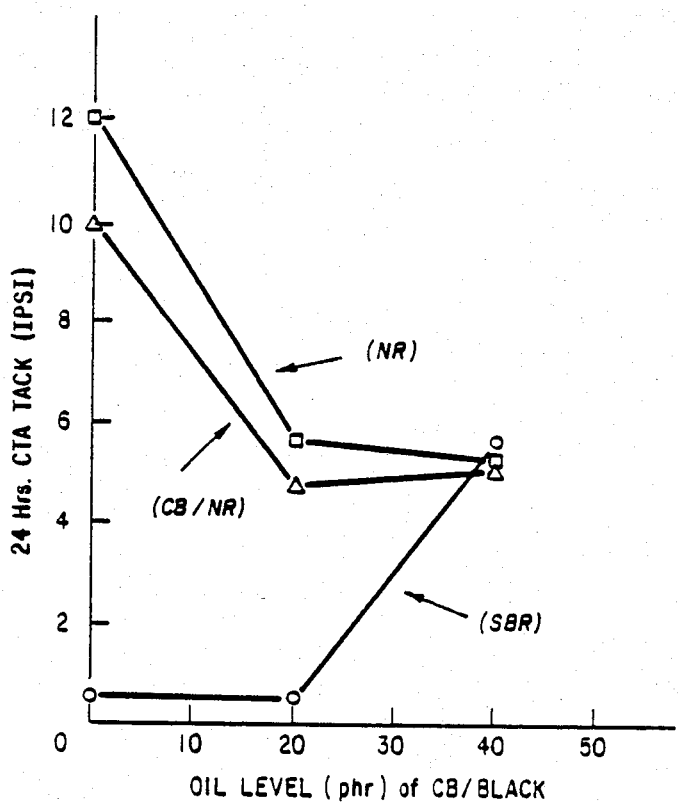
FIGS. 5 and 6 are graphs indicating the effect of oil in a substrate on the tack of the substrate cemented with such tread cement composition.
Figure 6:
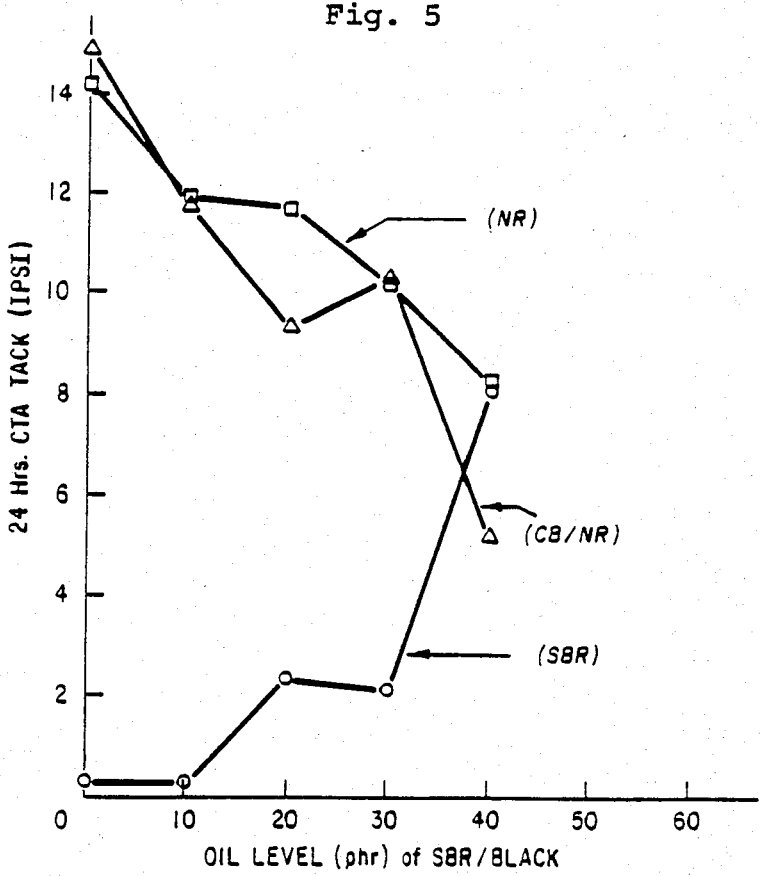

FIGS. 5 and 6 indicate the effect of the oil content of the rubber composition forming the substrate on the 24 hr CTA (countertop angle) tack when using the three different tread cements. FIG. 5 relates to a substrate formed from a carbon-black-reinforced cis-polybutadiene rubber composition, and FIG. 6 relates to a substrate formed from a carbon-black-reinforced SBR rubber composition. As indicated the UC cement behaves like the NR-based cement and provides less tack to the substrate as the oil content of the substrate is increased whereas the opposite is true for the SBR-based cement. The data indicate that the tack provided by the UC cement is far superior to that of the SBR-based cement as applied to synthetic rubber substrates with 20 to 30 phr of oil and is comparable to that provided by the SBR cement to substrates with 35 to 40 parts phr of oil.

Because the oil content of most tread compounds is limited, the UC tread cement of the present invention has a distinct advantage over the SBR-based tread cement in typical factory tire building operations. As indicated in FIGS. 1 to 4, the UC cement exhibits good tack retention characteristics which to a great extent resemble those of NR-based cements.

The data indicated by FIGS. 1 to 6 is based on a UC composition employing an 80/20 BR/NR blend and prepared by a special 3-stage Banbury mixing procedure to obtain an AMEDA carbon black dispersion rating of from about 97 to 98 percent. The conventional Banbury mixing procedures used by tire manufacturers are unable to provide such a composition with an AMEDA dispersion rating substantially above 90. The special mixing procedure is essential because the UC composition of this invention is unacceptable and has no practical utility when such AMEDA rating is below 95 percent.

The extraordinary properties of the UC composition as indicated in FIGS. 1 to 6 are characteristic of the preferred blends of 75 to 85 phr BR rubber and 15 to 25 phr natural rubber only when there is adequate dispersion of the carbon black. While similar advantages can be obtained using somewhat different blends, it is best to employ at least 75 phr of cis-BR rubber and no more than 5 phr of SBR, IR or other synthetic rubber. An acceptable tread cement cannot be made using less than 70 phr of BR rubber, and at least 20 phr of natural rubber should be used in cements containing from 70 to 75 phr of BR rubber.

The cement compositions of this invention provide good cured adhesion to conventional synthetic rubber tread cap compounds even when they contain 20 to 25 phr of natural rubber, which may seem surprising in view of the serious adverse effects of natural rubber in SBR tread cements. The universal suitability of the new cement for both NR-based and SBR-based rubber stocks is remarkable in view of this fact and the fact that BR rubber has notoriously poor tack, especially when applied to NR-based rubber compounds.

The BR/NR tread cement composition of this invention is unique and the first universal cement (UC) effective with both natural and all-synthetic rubber tire compounds. The remarkable versatility of the new tread cement makes it ideal for splicing the dual-layer treads of modern radial or bias/belted tires. Tests confirm that the new cement minimizes tread splice problems and greatly improves tire safety while reducing tire manufacturing costs.

The unique characteristics of the new BR-based cement make it practical for the tire industry to maintain much higher safety standards with respect to passenger car tires having treads designed to reduce rolling resistance and vehicle fuel consumption. In order to meet the practical limitations on rolling resistance imposed by consumers and by the government, tire manufacturers have reduced the oil content of modern tread compounds to such an extent as to create severe tread splicing problems (e.g., where the oil content is less than 35 phr). The industry constraints on oil content in the tread compounds present a serious safety problem because of the poor tack retention of SBR-based tread cements as exemplified in FIGS. 5 and 6. This is true in spite of many years of extensive and continual research to solve the tack problem.

One possible solution to the safety problem is to eliminate tread splicing as by the use of tread strip winding. The present invention eliminates the need for such drastic changes and makes it possible to produce anomaly-free radial and bias/belted tires meeting the highest quality standards while retaining the most economical tread splicing procedures.

The universal cements of the present invention are now being used for commercial manufacture of radial tires and have met with instant commercial success. The improvements in product safety and quality are demonstrated by a dramatic reduction in the number of reported tire failures involving the tread splice. The invention represents a significant advance in the tire adhesive art, one of the more important in the last decade with respect to radial tire manufacture.

Typical radial passenger car tires, for example, having dual-layer treads cemented with the new universal cement, when subjected to severe operating conditions for many thousands of miles (e.g., drive on the road at high speeds for 30,000 to 40,000 miles or more), can be driven to the point of failure without any problem at the tread splice. Extensive commercial experience with such tires clearly demonstrates that the universal cement of the present invention performs much better than any SBR-based cement or any other known tread cement.

It will be understood that, unless the context shows otherwise, all amounts, percentages and proportions set forth herein are by weight and that the terms used have their normal meanings as understood in the rubber art (see ASTM STP 184,1956).

I claim:

1. An adhesive composition for tread splicing containing
    (a) from 75 to 90 parts by weight of a cis-polybutadiene elastomer having a Mooney viscosity (ML-4) of at least 30;
    (b) from 10 to 25 parts by weight of natural rubber;
    (c) from 40 to 80 parts by weight of reinforcing carbon black having a surface area of at least 70 m$^2$/g;
    (d) from 5 to 30 parts by weight of a p-alkylphenol tackifying resin; and,
    (e) other compounding ingredients including zinc oxide, sulfur and an accelerator; the amounts by weight being based on 100 parts by weight of rubbers contained in the composition;
said adhesive composition having an AMEDA carbon black dispersion rating of at least 95 percent.

2. The composition according to claim 1 containing from 80 to 85 parts of cis-butadiene rubber, from 10 to 20 parts of natural rubber, and from 5 to 20 parts of a phenolic tackifying resin made from an alkylated phenol substituted in the para position with a tertiary alkyl group having a least 4 carbon atoms.

3. The composition according to claim 2 containing 40 to 70 parts of HAF carbon black and having an AMEDA carbon black dispersion rating of from 96 to 99 percent.

4. The composition according to claim 2 containing from 50 to 70 parts of said carbon black having an average particle size from 20 to 35 millimicrons, a surface area from 75 to 125 m$^2$/g, and a DBPA of from about 100 to 125 cm$^3$/100 g of carbon.

5. The composition according to claim 4 containing from 0.5 part to 2.5 parts of polymerized trialkyl dihydroquinoline and from 5 to 20 parts of a p-tert-alkyl phenol formaldehyde tackifying resin with a molecular weight from 500 to 2000.

6. A radial tire of generally toroidal shape having a fabric-reinforced carcass, an annular two-layer tread comprising an external circumferential cap portion and a circumferential undertread portion, and a plurality of circumferential belts between the tread and the carcass, each comprising wires or cords embedded in a natural rubber-based rubber compound, said tread having spliced tapered end portions joined by a compatible synthetic rubber-based tread-adhesive composition containing
    (a) from 75 to 90 parts by weight of a cis-polybutadiene elastomer having a Mooney viscosity (ML-4) of at least 30;
    (b) from 10 to 25 parts by weight of natural rubber;
    (c) from 40 to 80 parts by weight of reinforcing carbon black having a surface area of at least 70 m$^2$/g;
    (d) from 5 to 30 parts of a p-alkylphenol tackifying resin; and,
    (e) other compounding ingredients including zinc oxide, sulfur and an accelerator; the amounts by weight being based on 100 parts by weight of rubbers contained in the composition;
said adhesive composition having an AMEDA carbon black dispersion rating of at least 95 percent.

7. A tire according to claim 6 wherein the rubber compound forming said undertread portion contains at least 30 phr of natural rubber, said natural-rubber based compound contains at least 80 phr of natural rubber, and said tread adhesive composition contains at least 80 parts of a cis-polybutadiene elastomer, 50 to 70 parts of HAF carbon black, and from 10 to 20 parts of a p-tert-alkylphenol formaldehyde tackifying resin having a molecular weight of from 500 to 2000.

* * * * *